(12) United States Patent
Liu et al.

(10) Patent No.: US 8,414,853 B2
(45) Date of Patent: *Apr. 9, 2013

(54) SYSTEM AND METHOD FOR ENHANCED REMOVAL OF CO$_2$ FROM A MIXED GAS STREAM VIA USE OF A CATALYST

(75) Inventors: Zheng Liu, Knoxville, TN (US); Naresh B. Handagama, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 889 days.

This patent is subject to a terminal disclaimer.

(21) Appl. No.: 12/406,289

(22) Filed: Mar. 18, 2009

(65) Prior Publication Data

US 2009/0238742 A1 Sep. 24, 2009

Related U.S. Application Data

(60) Provisional application No. 61/038,467, filed on Mar. 21, 2008.

(51) Int. Cl.
*B01D 53/48* (2006.01)
(52) U.S. Cl.
USPC .............. 423/232; 423/228; 95/139; 95/161; 95/166; 261/94; 261/95
(58) Field of Classification Search .................. 423/232, 423/228; 95/166, 139, 161; 422/611; 261/94, 261/95, 98
See application file for complete search history.

(56) References Cited

U.S. PATENT DOCUMENTS

| | | | |
|---|---|---|---|
| 3,710,548 A | 1/1973 | Coughlin | |
| 6,187,277 B1 * | 2/2001 | Kirschner | 423/220 |
| 6,312,655 B1 * | 11/2001 | Hesse et al. | 423/232 |
| 7,067,456 B2 * | 6/2006 | Fan et al. | 502/400 |
| 7,235,677 B2 * | 6/2007 | Chipman et al. | 549/536 |
| 7,601,315 B2 * | 10/2009 | Ouimet | 423/228 |
| 7,754,102 B2 * | 7/2010 | Zhang et al. | 252/184 |
| 7,789,945 B2 * | 9/2010 | Lechnick et al. | 95/236 |
| 7,964,170 B2 * | 6/2011 | Singh | 423/224 |
| 2004/0231512 A1 | 11/2004 | Slayzak et al. | |
| 2006/0213224 A1 | 9/2006 | Fradette et al. | |
| 2010/0074828 A1 * | 3/2010 | Singh | 423/432 |

FOREIGN PATENT DOCUMENTS

| | | |
|---|---|---|
| WO | WO 98/55210 | 12/1998 |
| WO | WO 2006/022885 | 3/2006 |

OTHER PUBLICATIONS

PCT International Search Report and the Written Opinion of the International Searching Authority dated Jun. 8, 2009—(PCT/US2009/037608).

* cited by examiner

*Primary Examiner* — Nina Bhat
(74) *Attorney, Agent, or Firm* — Robert D. Crawford

(57) ABSTRACT

A solvent based flue gas processing system for removing CO$_2$ from a flue gas stream is described. A catalyst is provided to increase the efficiency of the solvent in capturing CO$_2$ from the flue gas stream or in regenerating the solvent.

20 Claims, 9 Drawing Sheets

SYSTEM AND METHOD FOR ENHANCED REMOVAL OF CO₂ FROM A MIXED GAS STREAM VIA USE OF A CATALYST

CROSS REFERENCE TO RELATED PATENT APPLICATION(S)

This application claims priority to U.S. provisional application entitled, "A System and Method for Enhanced Removal of $CO_2$ From a Mixed Gas Stream via Use Of a Catalyst," having U.S. Ser. No. 61/038,467, filed Mar. 21, 2008, the disclosure of which is entirely incorporated herein by reference; and is related to non-provisional U.S. patent application having Ser. No. 12/406,360, filed on Mar. 18, 2009, which claimed priority to U.S. provisional patent application having Ser. No. 61/038,494, filed on Mar. 21, 2008.

FIELD OF THE INVENTION

The proposed invention relates to a system and method for removing carbon dioxide ($CO_2$) from a process gas stream containing carbon dioxide and sulphur dioxide. More particularly, the proposed invention is directed to a solvent based flue gas processing system for removing $CO_2$ from a flue gas stream in which a catalyst is provided to increase the efficiency of the solvent in capturing CO2 from the flue gas stream or in regenerating the solvent.

BACKGROUND

In the combustion of a fuel, such as coal, oil, peat, waste, etc., in a combustion plant, such as those associated with boiler systems for providing steam to a power plant, a hot process gas (or flue gas) is generated. Such a flue gas will often contain, among other things, carbon dioxide ($CO_2$) The negative environmental effects of releasing carbon dioxide to the atmosphere have been widely recognised, and have resulted in the development of processes adapted for removing carbon dioxide from the hot process gas generated in the combustion of the above mentioned fuels. One such system and process has previously been disclosed and is directed to a single-stage Chilled Ammonia based system and method for removal of carbon dioxide (CO2) from a post-combustion flue gas stream.

Known solvent based CO2 capture systems, such as ammonia based systems and processes (CAP) provide a relatively low cost means for capturing/removing $CO_2$ from a gas stream, such as, for example, a post combustion flue gas stream. An example of such a system and process has previously been disclosed in pending patent application PCT/US2005/012794 (International Publication Number: WO 2006/022885/Inventor: Eli Gal)), filed on 12 Apr. 2005 and titled Ultra Cleaning of Combustion Gas Including the Removal of $CO_2$. In this process the absorption of $CO_2$ from a flue gas stream is achieved by contacting a chilled ammonia ionic ammonia solution (or slurry) with a flue gas stream that contains $CO_2$.

FIG. 1A is a diagram generally depicting a flue gas processing system 15 for use in removing various pollutants from a flue gas stream FG emitted by the combustion chamber of a boiler system 26 used in a steam generator system of, for example, a power generation plant. This system includes a CO2 removal system 70 that is configured to remove $CO_2$ from the flue gas stream FG before emitting the cleaned flue gas stream to an exhaust stack 90 (or alternatively additional processing). It is also configured to output CO₂ removed from the flue gas stream FG. Details of $CO_2$ removal system 70 are generally depicted in FIG. 1B.

With reference to FIG. 1B, CO2 removal System 70 includes a capture system 72 for capturing/removing $CO_2$ from a flue gas stream FG and a regeneration system 74 for regenerating ionic ammonia solution used to remove $CO_2$ from the flue gas stream FG. Details of capture system 72 are generally depicted in FIG. 1C.

With reference to FIG. 1C and FIG. 1D, a capture system 72 of a $CO_2$ capture system 70 (FIG. 1A) is generally depicted. In this system, the capture system 72 is a solvent based $CO_2$ capture system. More particularly, in this example, the solvent used is chilled ammonia. In a chilled ammonia (CAP) based system/method for $CO_2$ removal, an absorber vessel is provided in which an absorbent ionic ammonia solution (ionic ammonia solution) is contacted with a flue gas stream (FG) containing $CO_2$. The ionic ammonia solution is typically aqueous and may be composed of, for example, water and ammonium ions, bicarbonate ions, carbonate ions, and/or carbamate ions. An example of a known CAP $CO_2$ removal system is generally depicted in the diagrams of FIG. 1C and FIG. 1D.

With reference to FIG. 1C, an absorber vessel 170 is configured to receive a flue gas stream (FG) originating from, for example, the combustion chamber of a fossil fuel fired boiler 26 (see FIG. 1A). It is also configured to receive a lean ionic ammonia solution supply from regeneration system 74 (see FIG. 1B). The lean ionic ammonia solution is introduced into the vessel 170 via a liquid distribution system 121 while the flue gas stream FG is also received by the absorber vessel 170 via flue gas inlet 76.

The ionic ammonia solution is put into contact with the flue gas stream via a gas-liquid contacting device (hereinafter, mass transfer device, MTD) 111 used for contacting the flue gas stream with solvent and located in the absorber vessel 170 and within the path that the flue gas stream travels from its entrance via inlet 76 to the vessel exit 77. The gas-liquid contacting device 111 may be, for example, one or more commonly known structured or random packing materials, or a combination thereof.

Once contacted with the flue gas stream, the ionic ammonia solution acts to absorb CO2 from the flue gas stream, thus making the ionic ammonia solution "rich" with CO2 (rich solution). The rich ionic ammonia solution continues to flow downward through the mass transfer device and is then collected in the bottom 78 of the absorber vessel 170. The rich ionic ammonia solution is then regenerated via regenerator system 74 (see FIG. 1B) to release the $CO_2$ absorbed by the ionic ammonia solution from the flue gas stream. The $CO_2$ released from the ionic ammonia solution may then be output to storage or other predetermined uses/purposes. Once the $CO_2$ is released from the ionic ammonia solution, the ionic ammonia solution is said to be "lean". The lean ionic ammonia solution is then again ready to absorb $CO_2$ from a flue gas stream and may be directed back to the liquid distribution system 121 whereby it is again introduced into the absorber vessel 170. Details of regenerating system 74 are shown in FIG. 1E. System 74 includes a regenerator vessel 195. Regenerator vessel 195 is configured to receive a rich solution feed from the capture system 72 and to return a lean solution feed to the capture system 72 once CO2 has been separated from the rich solution.

During the regeneration process, the rich ionic ammonia solution is heated so that CO2 contained in the solution separates from the chilled ammonia solution. Once separated from the $CO_2$, ammonia (ammonia slip) is returned to the capture system for use in capturing further $CO_2$ from a gas stream.

These currently known solvent based $CO_2$ capture technologies typically consume approximately 20-30% of the power generated by the power generation system in order for the CO2 capture process to work effectively. In addition, these technologies often require a large portion of thermal energy generated by boiler/re-boiler functions (reboiler duty) in order to regenerate amine solution for re-use in capturing CO2 from a flue gas stream. In short, while there are known technologies for capturing CO2 from a flue gas stream, they require immense amounts of energy in order to function well. Further, in order to maximize/optimize the amount of time that flue gas is in contact with amine, the physical size of the absorber and/or re-generator tanks in a typical system must be very large. The cost to design and implement these towers of such large scale is very high. Additionally, the physical space that is required on-site to accommodate these vessels is significant. Where on-site space is limited, additional steps must be taken to implement the vessels/system in the limited space, if possible.

SUMMARY OF THE INVENTION

Embodiments of the present invention provide for flue gas processing system for use with a fossil fuel fired boiler. Briefly described, in architecture, one embodiment of the system, among others, can be implemented as a flue gas processing system that includes an absorber tower configured to receive a mixed gas stream containing carbon dioxide and to contact it with a solvent; and the absorber tower comprises packing materials that are coated with a catalyst.

Embodiments of the present invention can also be viewed as providing methods for processing a mixed gas stream wherein the method includes the steps of: receiving a flue gas stream from the combustion chamber of a boiler; contacting the flue gas stream with a solvent and contacting the solvent with a catalyst.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The present invention may be better understood and its numerous objects and advantages will become apparent to those skilled in the art by reference to the accompanying drawings in which.

DISCUSSION

The proposed invention is directed to increasing $CO_2$ capture efficiency in a solvent based capture system for use in processing, for example, a flue gas stream. The proposed invention is also directed to efficiently regenerating a solvent used to capture $CO_2$.

Figure 1A:
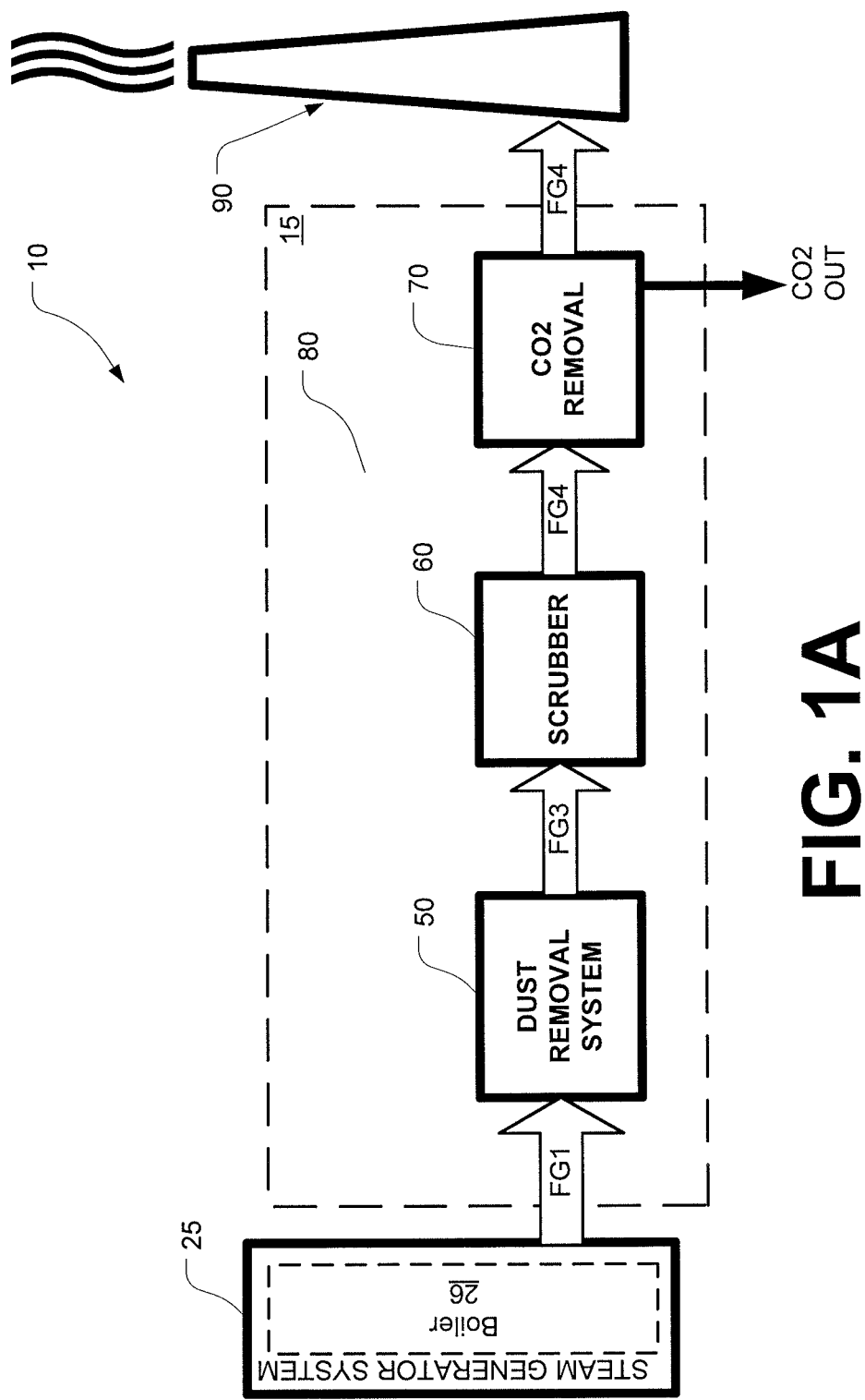
FIG. 1A-FIG. 1C are diagram generally depicting a typical flue gas processing system 15 with provisions for CO2 removal.
Figure 1B:
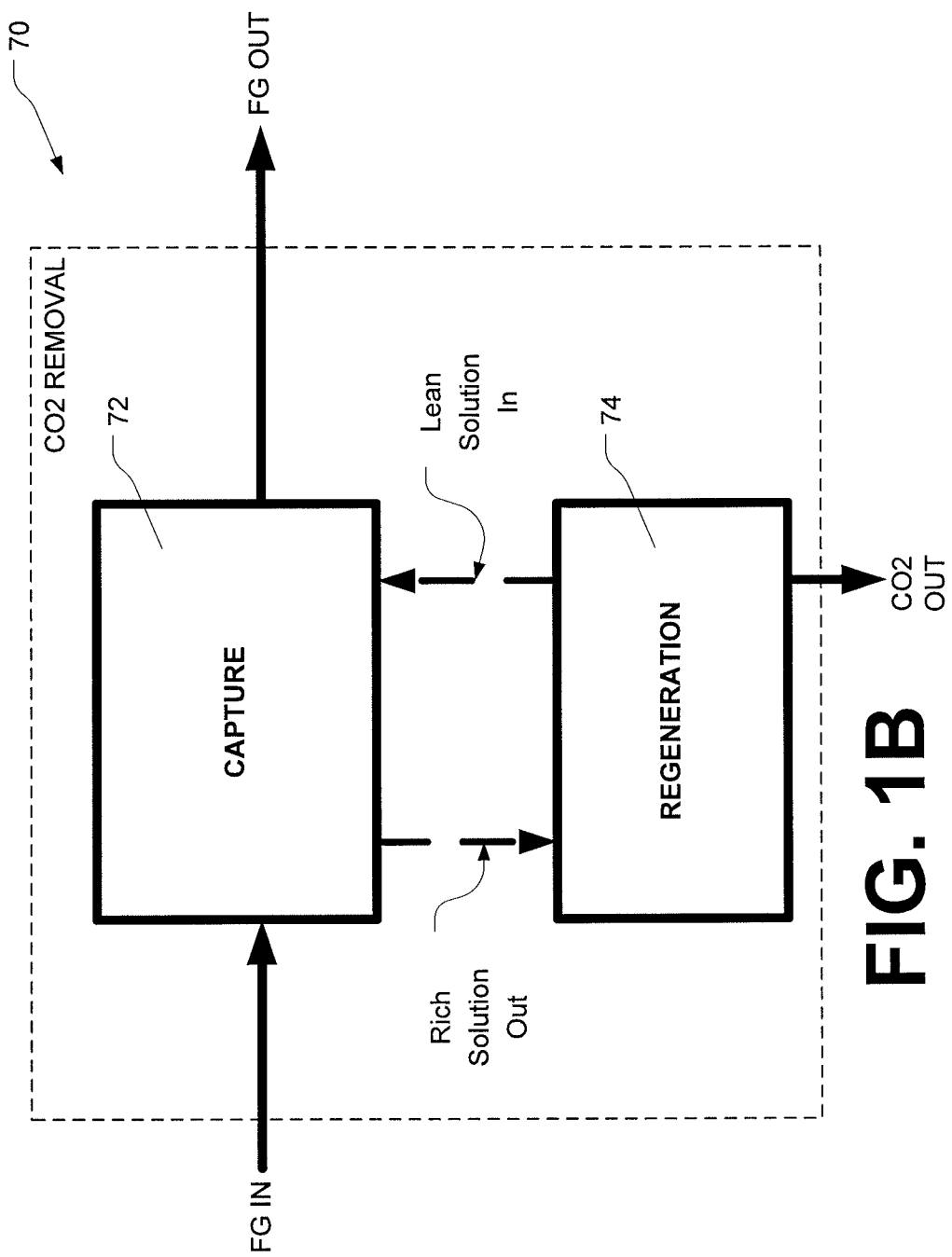
Figure 1C:
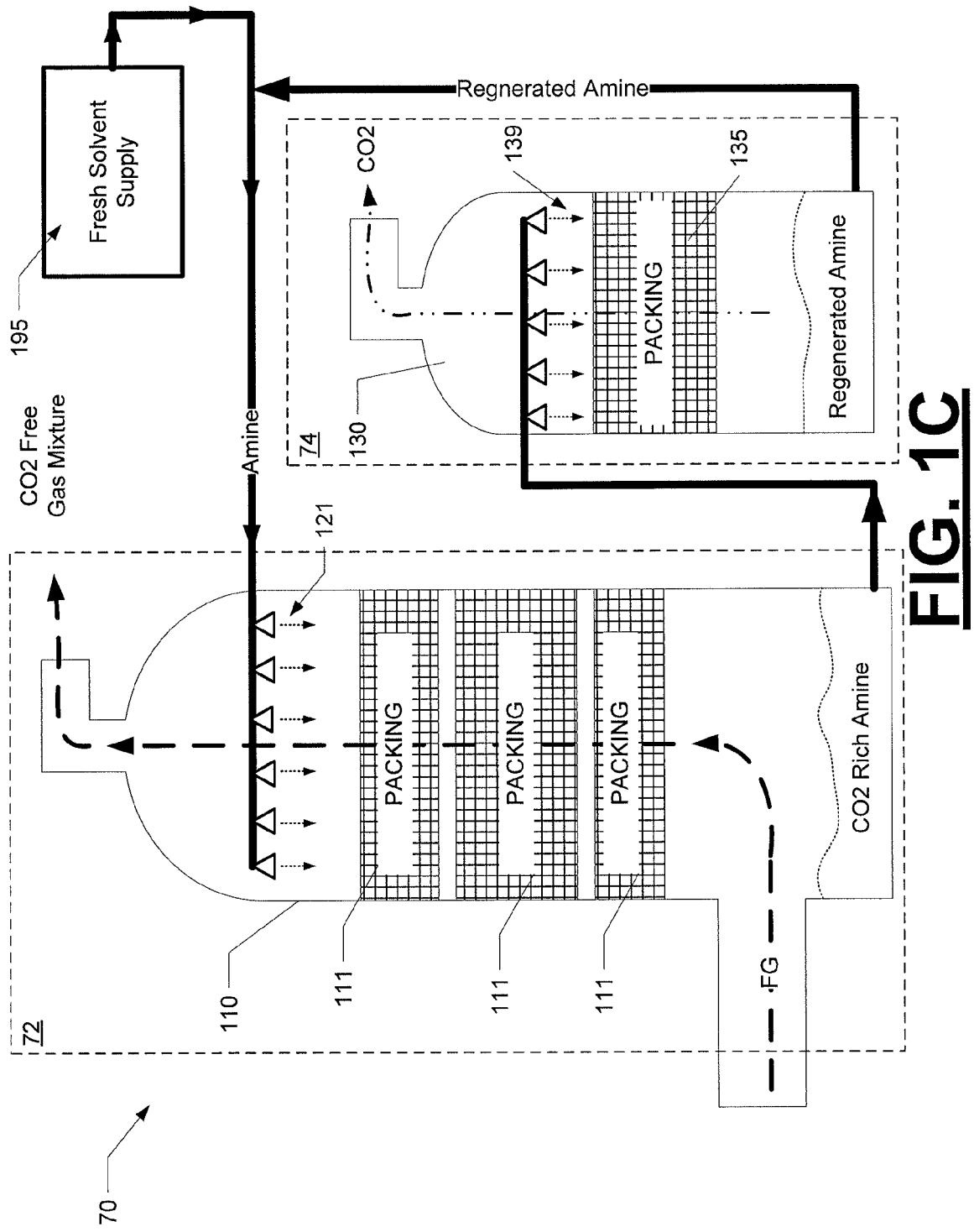
Figure 2A:
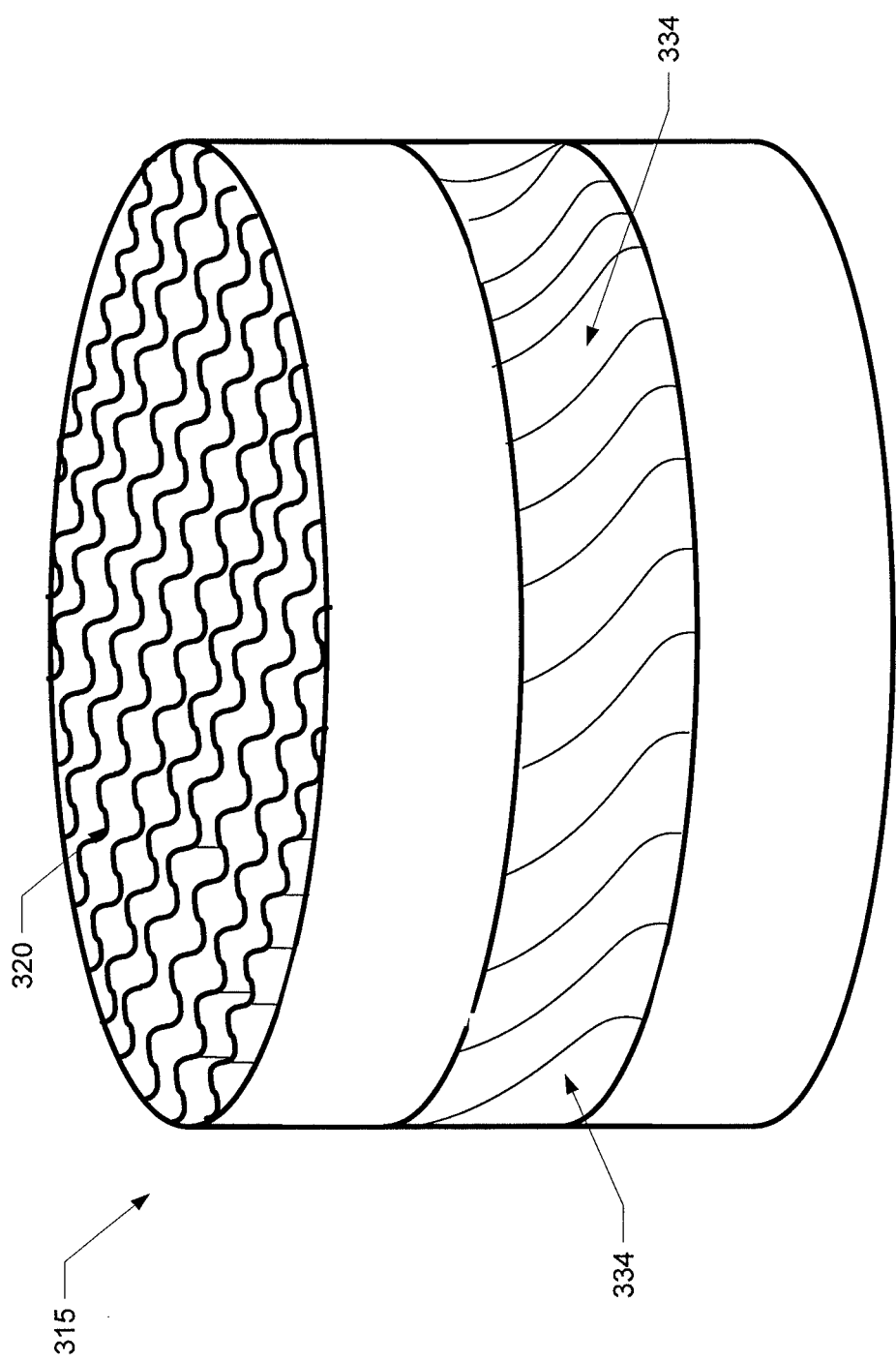
FIG. 2A-FIG. 2D are diagrams generally illustrating an example of packing materials 315 on which a catalyst has been immobilized on the wall/surfaces of the packing materials.
Figure 2B:
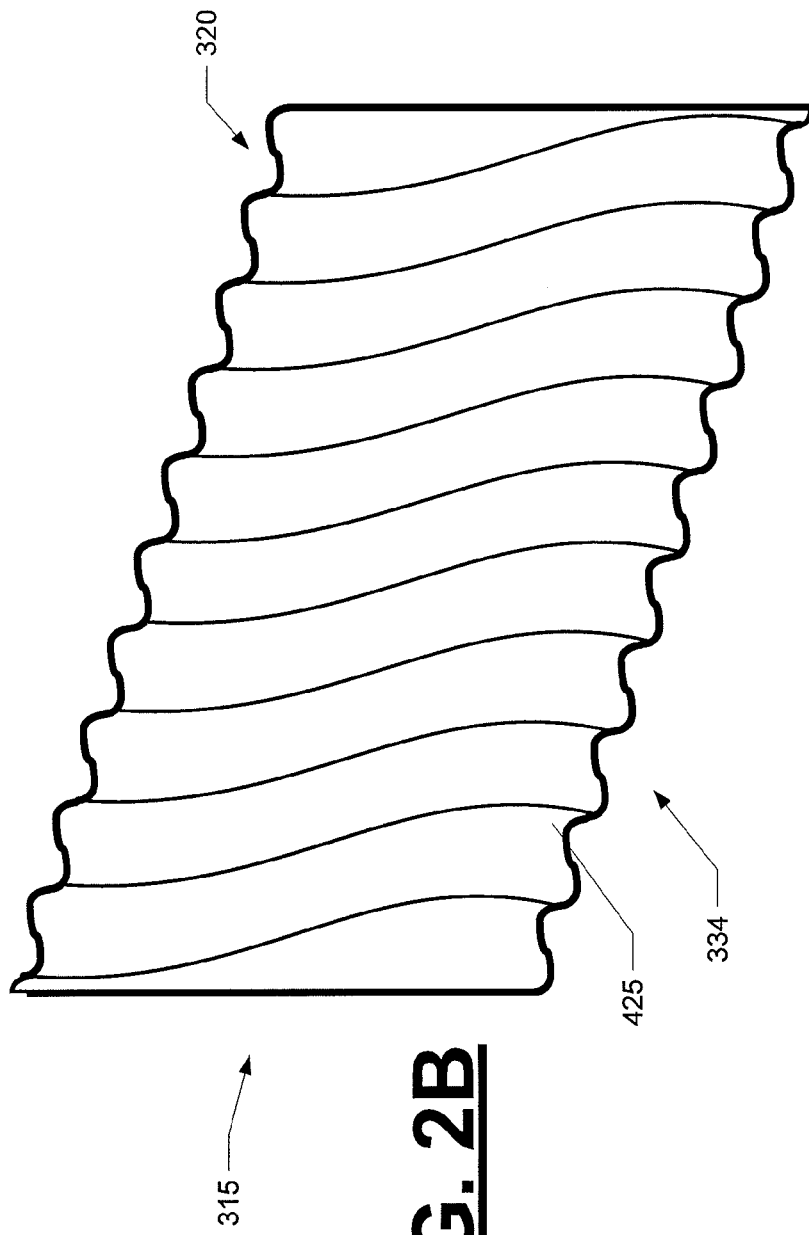
Figure 2C:
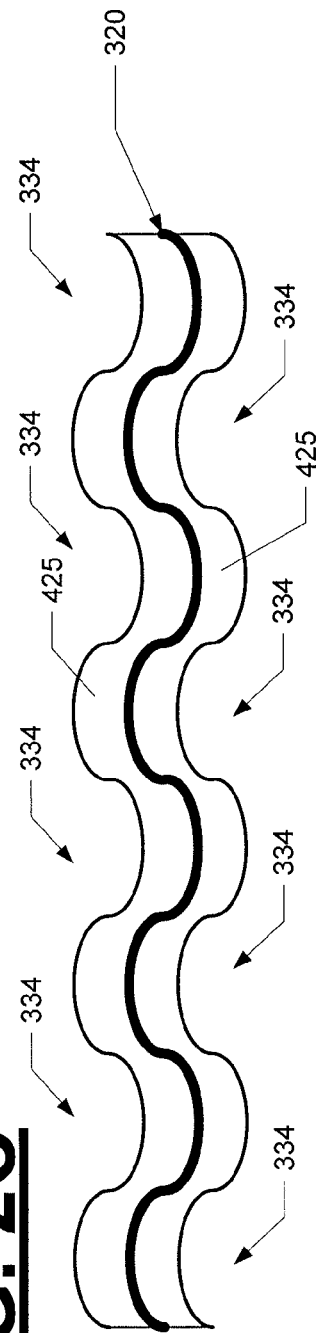
Figure 2D:
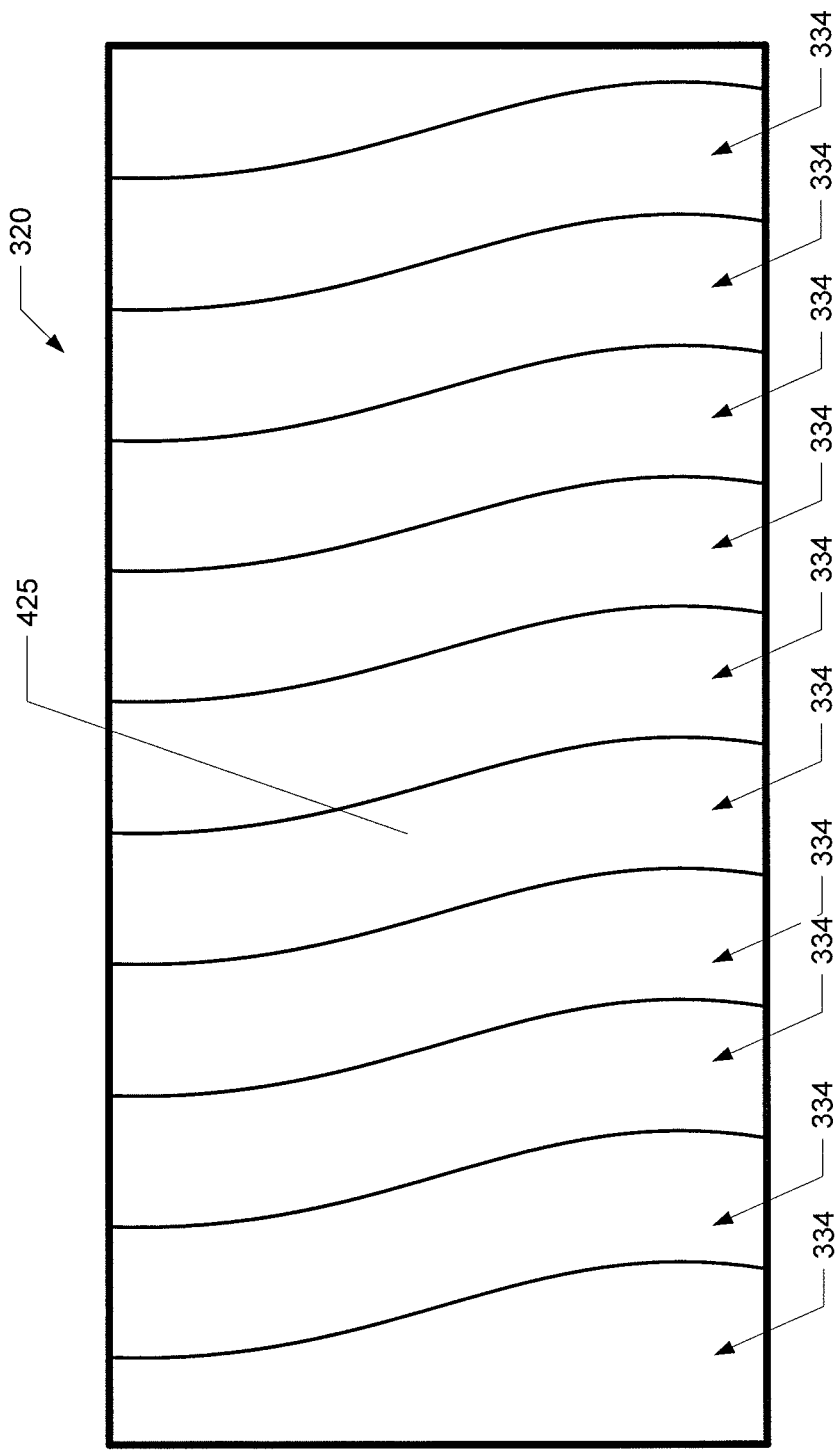

In one embodiment of the proposed invention a catalyst 425 that is coated (or immobilized) on one or more surfaces of the packing materials 315 located in the absorber tower 110 of an amine or ammonia based $CO_2$ capture system 70. FIG. 2A-FIG. 2C are diagrams generally depicting packing materials 315 that have been coated with a catalyst 425. FIGS. 2B and 2C shows that the packing materials 315 may be composed of, for example, a series of corrugated support structures 320 arranged in close proximity to each other so as to form a series of channels 334 through which flue gas entering the absorber vessel 110 flow. The catalyst 425 is coated on one or more surfaces of each corrugated support structures 320. The corrugated troughs 334 form pathways for the flue gas to pass through the packing materials 315 thereby contacting the catalyst layer 425.

The catalyst 425 may be either a homogeneous and/or a heterogeneous catalyst. Homogeneous type catalyst may include, for example, organo-metallic complex composed of transition metal and inorganic/organic ligands (such as bi-pyradine, aromatics, halogen, etc). Formation of the transition metal complex is one of the most powerful and universal ways of activating inert molecules. Coordination results in a change of reactivity of the ligands and creates favourable steric conditions for ligand interaction. This activation via coordination enables one to carry out numerous catalytic reactions under the influence of transition metal compounds. Other examples of catalyst that may be used include, but are not limited to, for example, organo-metallic complex catalysts, such as, for example, halogen-type complex, $Ni(bpy)_3Cl_2$) [bpy: bipyridine].

Heterogeneous type catalyst may include, for example, metals or their compounds such as oxides (e.g. MgO), chloride $MgCl_2$, etc. (Oxide preferably will not include sulphide and chloride. They are independent of each other) that are dispersed, preferably evenly, on solid materials with a high BET surface area, such as, for example, polymer, metal oxides, $SiO_2$, molecular sieves, base- and/or acid-modified clay, etc.

The catalyst 425 is provided to promote the reaction of $CO_2$ with a solvent 30 such as amine or chilled ammonia, thus resulting in the solvent being able to capture more $CO_2$ per given period of time (i.e. enhanced amine-based CO2 capture efficiency).

Figure 3:
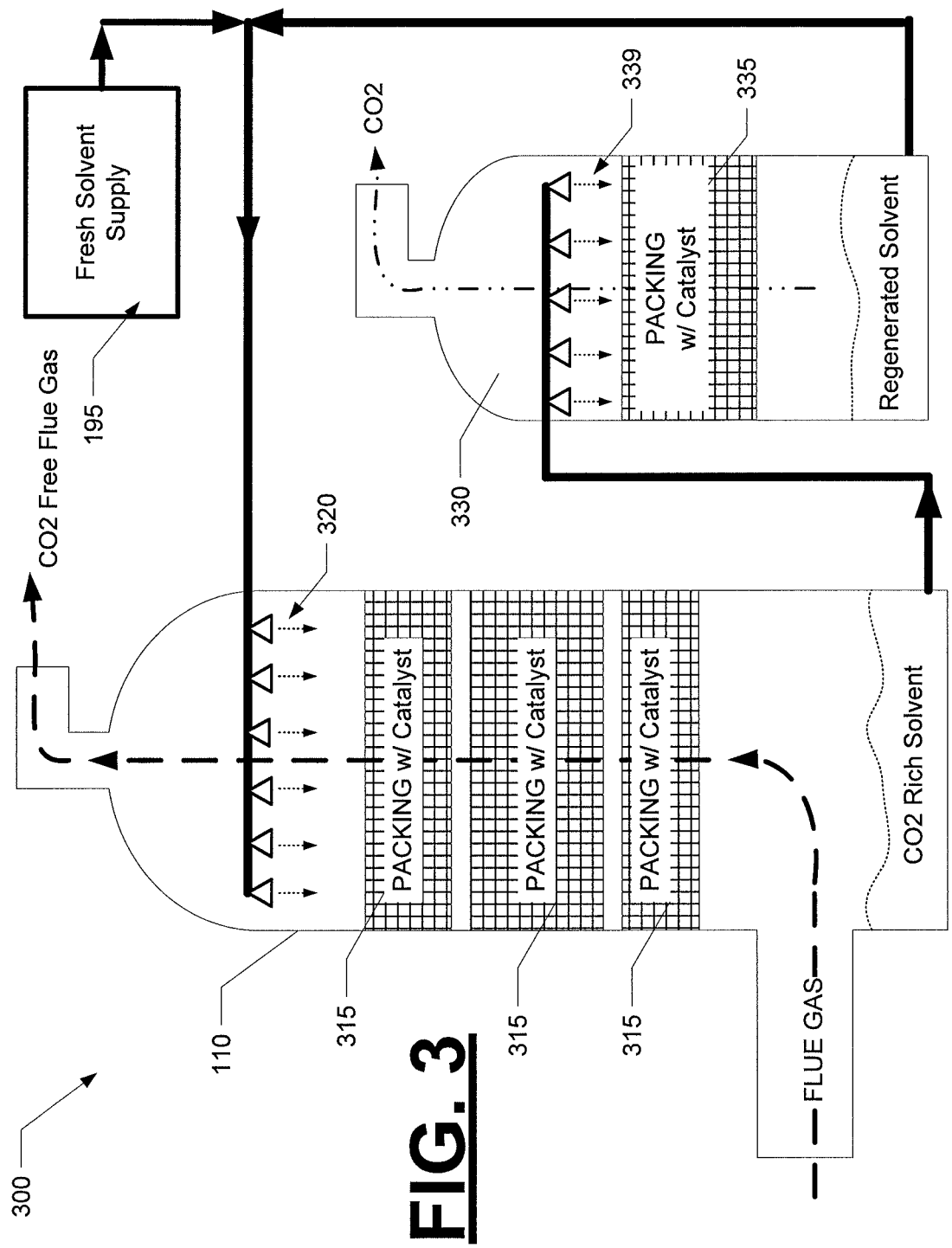
FIG. 3 is a diagram generally depicting relevant portions of an amine or ammonia based CO2 capture system 70 in which absorber 110 and regenerator 330 are provided with packing materials 315 and 335, respectively that have been coated with a catalyst.

Catalyst on Packing Materials in Regeneration Tower—In one embodiment of the proposed invention, a catalyst is coated/immobilized on one or more surfaces of the packing materials in the regeneration tower of an amine or ammonia based $CO_2$ capture system. The catalyst may be either a homogeneous and/or a heterogeneous catalyst. The catalyst is provided to promote the regeneration of solvent (ex: amine or ammonia) after it has reacted/interacted with $CO_2$. The catalyst is selected and provided to promote the decomposition of products formed from the interaction/reaction between CO2 and amine, thus resulting in the amine being able to regenerate more efficiently from the rich amine solution per given period of time (i.e. enhanced amine-based CO2 capture efficiency). This embodiment is generally depicted in FIG. 3.

Figure 4A:
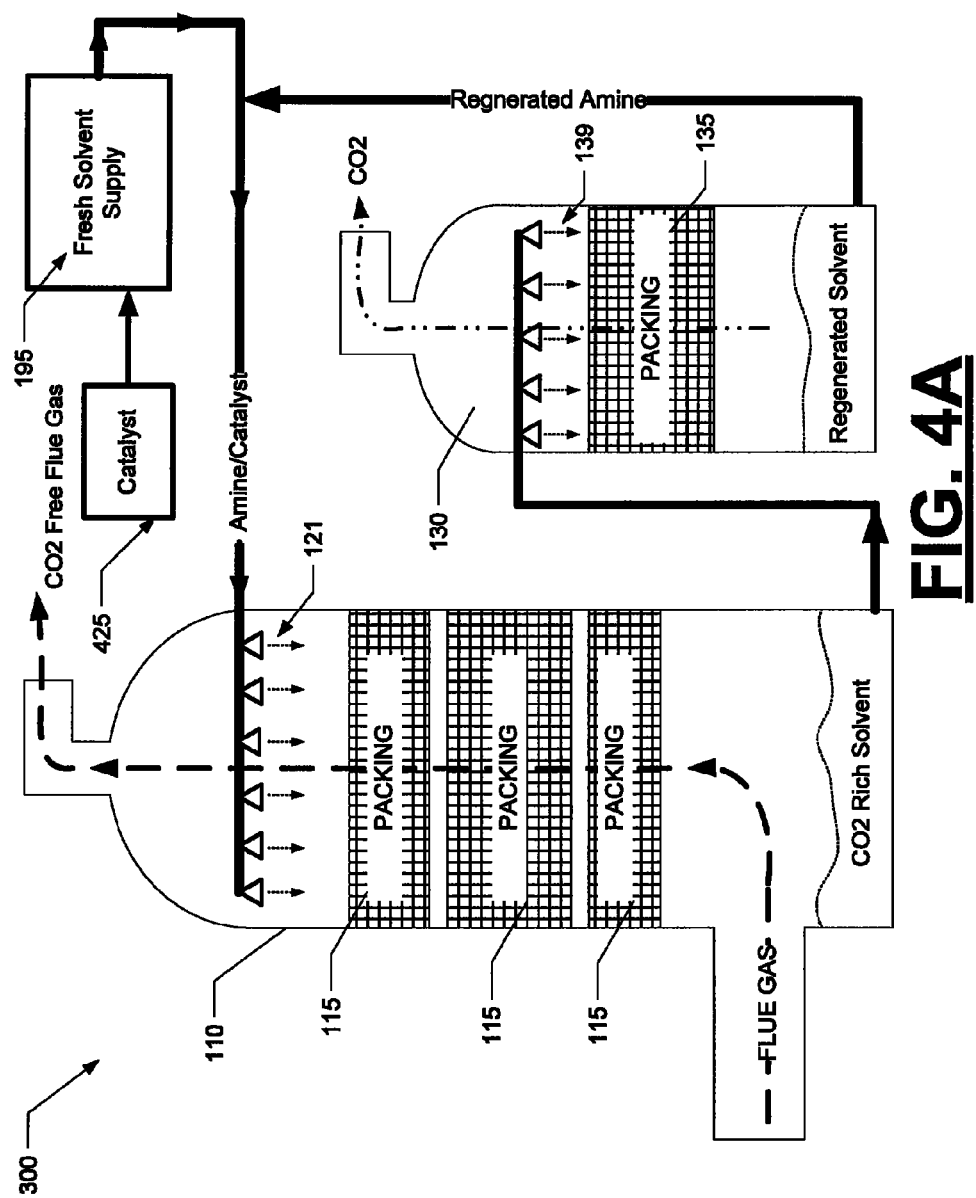
FIG. 4A is a diagram generally depicting relevant portions of an amine or ammonia based CO2 capture system 70 in which a catalyst 425 is added to the solvent supply 195 (FIG. 4A) or alternatively it may be added directly into the solvent supply feed. In this example, the solvent is amine or ammonia.
Figure 4B:
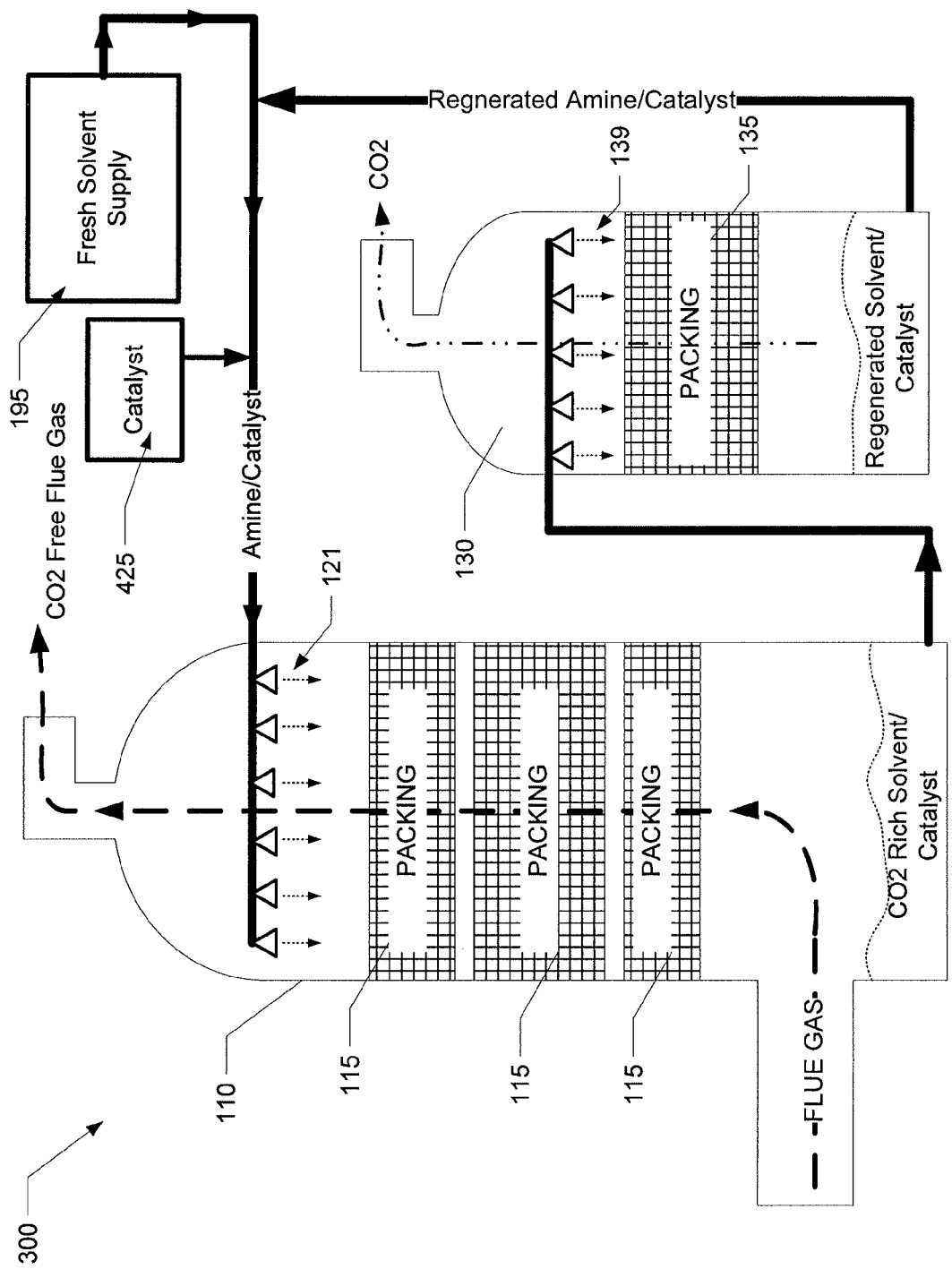
FIG. 4B is a diagram generally depicting relevant portions of an amine or ammonia based CO2 capture system 70 in which a catalyst 425 is added directly into the solvent supply feed.

In a further embodiment, a catalyst is added to a solvent, such as, for example, amine or ammonia, that is used to capture $CO_2$ from a flue gas stream. The catalyst may also be used to promote the regeneration of solvent after it has reacted with CO2. In this embodiment, a homogenous catalyst may be used. This embodiment is generally depicted in FIG. 4A and FIG. 4B. FIG. 4A illustrates how the catalyst 425 can be fed directly to the solvent supply tank 510. FIG. 4B illustrates how the catalyst 425 can be combined with the solvent supply that is feeding the liquid distribution system 121.

In a flue gas processing system 15 wherein a catalyst 425 is coated/immobilized/layered on packing materials 315 in both the absorber tower 110 and the regeneration tower 330, the catalyst 425 used in both the absorber tower 110 and the regeneration tower 330 may be the same catalyst or different catalysts. It is not necessary that the same catalyst be used in connection with both capture and regeneration.

The catalyst 425 may be dispersed/layered/coated onto the solid material 320 with a high BET surface area, such as for example, 100-1000 $m^2/g$, square meter per gram solid materials, via, for example, a wet impregnation, followed by being coated/immobilized onto the packing materials 315 located in, for example, the Absorber tower 110 and/or regeneration tower/stripper 330. This may be accomplished via, for example, known wash-coating techniques, such as those employed in, for example, industrial catalyst preparation processes. These solid materials may be used to make up the packing materials or parts thereof.

Alternately, catalysts (organo-metallic complex, transition metal as well as its salt) may be directly coated onto the packing materials 315 (see FIG. 2A-FIG. 2C) to form a catalyst film (or layer). This may be accomplished via, for example, known coating technologies such as those employed in, for example, industrial semiconductor preparation or self-assembly process or electrochemical coating processes. Some examples of catalysts that may be used include, but are not limited to, for example, organo-metallic complex catalysts, such as, for example, halogen-type complex, $Ni(bpy)_3Cl_2$) [bpy: bipyridine] and transition metal-based inorganic catalysts.

Any homogeneous and/or heterogeneous catalysts can be used in CO2 capture operations to activate $CO_2$ adsorbed onto the surface of the catalyst 425 and catalyse carbonation/bi-carbonation and carbomation of amine with CO2 via homogeneous and/or heterogeneous processes. Also these catalysts can be used in solvent (example: amine or ammonia) regeneration to catalyse the decomposition of products formed from the carbonation/bi-carbonation and carbomation of amine with CO2.

While the invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed:

1. A flue gas processing system comprising:
   an absorber tower configured to receive a mixed gas stream containing carbon dioxide and to receive a solvent for contact between said mixed gas stream and said solvent in the presence of a catalyst for the catalyst to promote capture of carbon dioxide from said mixed gas stream by said solvent to produce a carbon dioxide rich solvent.

2. The system of claim 1 wherein the catalyst is a homogeneous catalyst.

3. The system of claim 1 wherein the catalyst is a heterogeneous catalyst.

4. The system of claim 1 wherein said solvent is an amine based.

5. The system of claim 1 wherein the catalyst promotes the capture of carbon dioxide by the solvent from the mixed gas stream.

6. The system of claim 1 wherein said solvent is a carbon dioxide lean solvent cooled prior to contact with said mixed gas stream.

7. The system of claim 1 further comprising a regeneration tower configured to receive said carbon dioxide rich solvent for contact with a catalyst to promote carbonation and to produce a carbon dioxide lean solvent.

8. The system of claim 7 wherein the carbon dioxide rich solvent is heated prior to contact with the regeneration tower catalyst.

9. The system of claim 7 wherein the absorber tower catalyst and the regeneration tower catalyst may be the same or different catalysts.

10. A process for removing carbon dioxide from a mixed gas comprising:
    passing a mixed gas containing carbon dioxide through an absorber tower configured to receive a solvent for contact of the solvent with the mixed gas in the presence of a catalyst for the catalyst to promote carbon dioxide capture from the mixed gas by the solvent to produce a carbon dioxide rich solvent.

11. The process of claim 10 wherein the catalyst is a homogeneous catalyst.

12. The process of claim 10 wherein the catalyst is a heterogeneous catalyst.

13. The process of claim 10 wherein the solvent is amine or ammonia based.

14. The process of claim 10 wherein the absorber tower is configured to prolong contact between the mixed gas and the solvent.

15. The process of claim 10 wherein the solvent is cooled prior contact with the mixed gas.

16. The process of claim 10 wherein the solvent is a carbon dioxide lean solvent.

17. The process of claim 10 further comprising a regeneration tower configured to receive the carbon dioxide rich solvent for contact with a catalyst to promote carbonation of the carbon dioxide rich solvent to produce a carbon dioxide lean solvent.

18. The process of claim 17 wherein the carbon dioxide rich solvent is heated prior to or within said regeneration tower.

19. The process of claim 17 wherein said carbon dioxide lean solvent may be circulated to the absorber tower.

20. The process of claim 17 wherein said regeneration tower catalyst may be the same or different from the absorber tower catalyst.

* * * * *